(12) United States Patent
Kim et al.

(10) Patent No.: US 12,240,201 B2
(45) Date of Patent: Mar. 4, 2025

(54) COVER WINDOW AND DISPLAY APPARATUS HAVING THE SAME

(71) Applicant: SAMSUNG DISPLAY CO., LTD., Yongin-si (KR)

(72) Inventors: Youngdo Kim, Yongin-si (KR); Hyukhwan Kim, Yongin-si (KR); Hyunseok Oh, Yongin-si (KR); Kangwoo Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 85 days.

(21) Appl. No.: 17/674,215

(22) Filed: Feb. 17, 2022

(65) Prior Publication Data

US 2023/0041968 A1    Feb. 9, 2023

(30) Foreign Application Priority Data

Aug. 9, 2021  (KR) ........................ 10-2021-0104805

(51) Int. Cl.
*B32B 17/06*  (2006.01)
*B32B 5/02*  (2006.01)
(Continued)

(52) U.S. Cl.
CPC ............ *B32B 17/067* (2013.01); *B32B 5/024* (2013.01); *B32B 5/12* (2013.01); *B32B 5/262* (2021.05); *B32B 7/022* (2019.01); *B32B 17/04* (2013.01); *B32B 2250/03* (2013.01); *B32B 2250/04* (2013.01); *B32B 2260/021* (2013.01);
(Continued)

(58) Field of Classification Search
CPC ......... B32B 7/022; B32B 7/067; B32B 5/024; B32B 5/12; B32B 17/04; B32B 17/10; B32B 2250/03; B32B 2250/04; B32B 2260/021; B32B 2260/046; B32B 2262/101; B32B 2307/732; B32B 2457/20; B32B 17/067; B32B 17/06;
(Continued)

(56) References Cited

U.S. PATENT DOCUMENTS 3,089,801 A * 5/1963 Tierney ............. B32B 17/10366
 156/247
8,372,504 B2 2/2013 Bae et al.
(Continued)

FOREIGN PATENT DOCUMENTS

KR     101084356 B1    11/2011
KR     101097431 B1    12/2011
(Continued)

OTHER PUBLICATIONS

Translation of KR20130117464 (description and claims). (Year: 2013).*

*Primary Examiner* — Catherine A. Simone
(74) *Attorney, Agent, or Firm* — CANTOR COLBURN LLP

(57) ABSTRACT

A cover window includes a glass fiber composite layer including a first glass fiber layer and a first glass disposed on a first surface of the glass fiber composite layer. The first glass fiber layer includes unidirectional glass fibers apart from each other and each extending in a first direction, and a modulus of the first glass fiber layer in the first direction is greater than a modulus of the first glass fiber layer in a second direction perpendicular to the first direction.

10 Claims, 15 Drawing Sheets

(51) Int. Cl.
*B32B 5/12* (2006.01)
*B32B 5/26* (2006.01)
*B32B 7/022* (2019.01)
*B32B 17/04* (2006.01)
*G06F 1/16* (2006.01)

(52) U.S. Cl.
CPC ... *B32B 2260/046* (2013.01); *B32B 2262/101* (2013.01); *B32B 2307/732* (2013.01); *B32B 2457/20* (2013.01); *G06F 1/1652* (2013.01)

(58) Field of Classification Search
CPC ........ B32B 17/10036; B32B 17/10018; B32B 3/30; B32B 3/28; G06F 1/1652
USPC .......................................... 428/293.4, 293.7
See application file for complete search history.

(56) References Cited

U.S. PATENT DOCUMENTS

| | | | |
|---|---|---|---|
| 8,415,003 | B2 | 4/2013 | Lee et al. |
| 9,469,735 | B2 | 10/2016 | Yoon et al. |
| 2016/0009593 | A1* | 1/2016 | Brychell ................ B32B 17/06 156/60 |

FOREIGN PATENT DOCUMENTS

| | | |
|---|---|---|
| KR | 101228408 B1 | 1/2013 |
| KR | 1020130117464 A | 10/2013 |
| KR | 101482707 B1 | 1/2015 |
| KR | 101737155 B1 | 5/2017 |
| KR | 102206160 B1 | 1/2021 |

* cited by examiner

COVER WINDOW AND DISPLAY APPARATUS HAVING THE SAME

This application claims priority to Korean Patent Application No. 10-2021-0104805, filed on Aug. 9, 2021, and all the benefits accruing therefrom under 35 U.S.C. § 119, the content of which in its entirety is herein incorporated by reference.

BACKGROUND

1. Field

One or more embodiments relate to a cover window and a display apparatus including the cover window, and more particularly, to a cover window with improved impact resistance and flexibility and a display apparatus including the cover window.

2. Description of the Related Art

Electronic devices, such as smartphones, digital cameras, notebook computers, navigation systems, and smart televisions, etc. that provide images to users, may include display apparatuses for displaying images. A display apparatus typically includes a display panel for generating and displaying an image, and a cover window arranged on the display panel to protect the display panel.

Recently, as the display apparatus is widely used in various fields, various designs for improving the quality and function of the display apparatus have been attempted. Recently, flexible display panels such as a foldable display panel that can be folded and a rollable display panel that can be rolled into a roll shape have been developed. Each component of a flexible display panel may include or be made of a flexible material such as plastic, etc. and thus may have a flexible characteristic.

SUMMARY

In a flexible display panel, a cover window applied thereto is desired to have impact resistance to protect the flexible display panel from external impact and at the same time have flexibility. Various studies have been attempted to develop a cover window having such characteristics.

However, in a conventional cover window and a display apparatus including such a conventional cover window, impact resistance may be relatively poor by applying a cover window to which an ultra-thin glass is applied to improve flexibility, and when the thickness of the cover window is increased to improve impact resistance, flexibility may be reduced.

One or more embodiments include a cover window with improved impact resistance and flexibility and a display apparatus including the cover window.

According to one or more embodiments, a cover window includes a glass fiber composite layer including a first glass fiber layer and a first glass arranged on a first surface of the glass fiber composite layer, where the first glass fiber layer includes unidirectional glass fibers apart from each other, each of the unidirectional glass fibers extends in a first direction, and a modulus of the first glass fiber layer in the first direction is greater than a modulus of the first glass fiber layer in a second direction perpendicular to the first direction.

According to an embodiment, the glass fiber composite layer may further include a second glass fiber layer including woven glass fibers.

According to an embodiment, the first glass fiber layer may be between the first glass and the second glass fiber layer.

According to an embodiment, the second glass fiber layer may be between the first glass and the first glass fiber layer.

According to an embodiment, the first glass fiber layer may include a first-first glass fiber layer and a second-first glass fiber layer, and the second glass fiber layer may be between the first-first glass fiber layer and the second-first glass fiber layer.

According to an embodiment, the second glass fiber layer may include a first-second glass fiber layer and a second-second glass fiber layer, and the first glass fiber layer may be between the first-second glass fiber layer and the second-second glass fiber layer.

According to an embodiment, a thickness of the first glass fiber layer may be greater than a thickness of the second glass fiber layer.

According to an embodiment, the first glass may include a plurality of trenches apart from each other, and each of the plurality of trenches may include unidirectional glass fibers extending in the first direction.

According to an embodiment, the cover window may further include a second glass disposed on a second surface of the glass fiber composite layer, which is opposite to the first surface.

According to an embodiment, the cover window may include a first unfolding area, a second unfolding area, and a folding area therebetween, and the glass fiber composite layer may be disposed in at least the folding area.

According to one or more embodiments, a display apparatus includes a display panel including pixels, and a cover window disposed on the display panel. In such embodiments, the cover window includes a glass fiber composite layer including a first glass fiber layer, and a first glass disposed on a first surface of the glass fiber composite layer, where the first glass fiber layer includes unidirectional glass fibers apart from each other, each of the unidirectional glass fibers extends in a first direction, and a modulus of the first glass fiber layer in the first direction is greater than a modulus of the first glass fiber layer in a second direction perpendicular to the first direction.

According to an embodiment, the glass fiber composite layer may further include a second glass fiber layer including woven glass fibers.

According to an embodiment, the first glass fiber layer may be between the first glass and the second glass fiber layer.

According to an embodiment, the second glass fiber layer may be between the first glass and the first glass fiber layer.

According to an embodiment, the first glass fiber layer may include a first-first glass fiber layer and a second-first glass fiber layer, and the second glass fiber layer may be between the first-first glass fiber layer and the second-first glass fiber layer.

According to an embodiment, the second glass fiber layer may include a first-second glass fiber layer and a second-second glass fiber layer, and the first glass fiber layer may be between the first-second glass fiber layer and the second-second glass fiber layer.

According to an embodiment, a thickness of the first glass fiber layer may be greater than a thickness of the second glass fiber layer.

According to an embodiment, the first glass may include a plurality of trenches apart from each other, and each of the plurality of trenches may include unidirectional glass fibers extending in the first direction.

According to an embodiment, the cover window may further include a second glass disposed on a second surface of the glass fiber composite layer, which is opposite to the first surface.

According to an embodiment, the cover window may include a first unfolding area, a second unfolding area, and a folding area therebetween, and the glass fiber composite layer may be disposed in at least the folding area.

These and/or other aspects will become apparent and more readily appreciated from the following description of the embodiments, taken in conjunction with the accompanying drawings.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
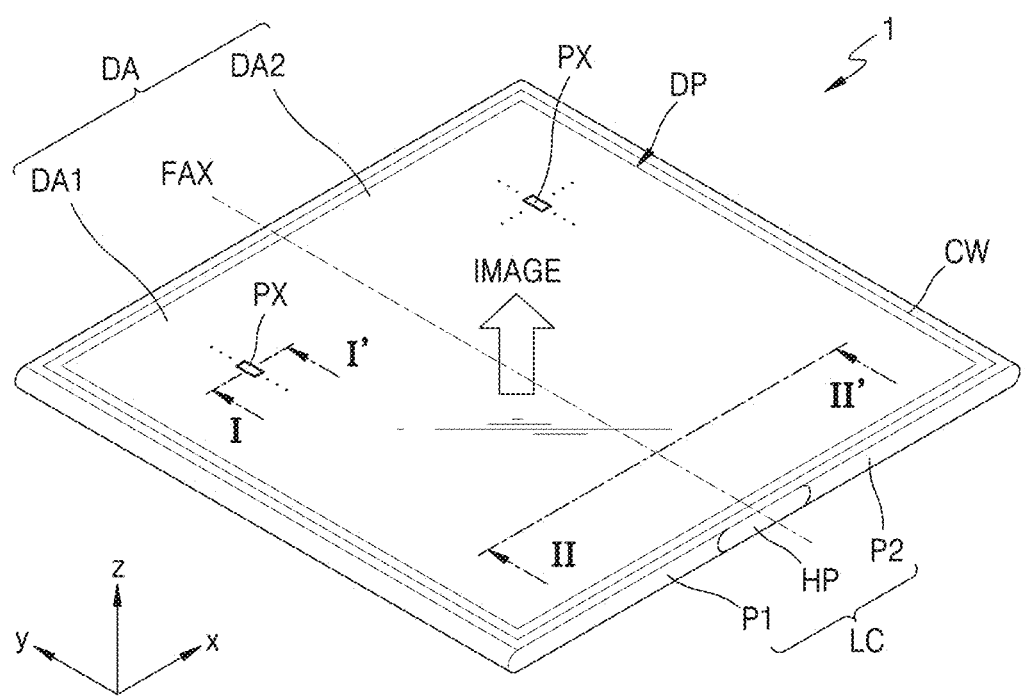
FIGS. 1 and 2 are perspective views illustrating a portion of a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

Since the disclosure may have diverse modified embodiments, certain embodiments are illustrated in the drawings and are described in the detailed description. Advantages and features of the disclosure, and implementation methods thereof will be clarified through following embodiments described with reference to the accompanying drawings. The disclosure may, however, be embodied in many different forms and should not be construed as limited to the embodiments set forth herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when a layer, region, or component is referred to as being "formed on" another layer, region, or component, it can be directly or indirectly formed on the other layer, region, or component. That is, for example, intervening layers, regions, or components may be present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Sizes of elements in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion, and/or an intervening layer, region, or component may exist, such that the layer, region, or component may be indirectly connected to the portion. For example, when a layer, region, or component is electrically connected to another portion, the layer, region, or component may be directly electrically connected to the portion and/or may be indirectly connected to the portion through another layer, region, or component.

An x-axis, a y-axis and a z-axis are not limited to three axes of the rectangular coordinate system and may be interpreted in a broader sense. For example, the x-axis, the y-axis, and the z-axis may be perpendicular to one another, or may represent different directions that are not perpendicular to one another.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described in detail with reference to the accompanying drawings. The same reference numerals are used to denote the same elements, and any repetitive detailed descriptions thereof will be omitted or simplified.

Figure 2:
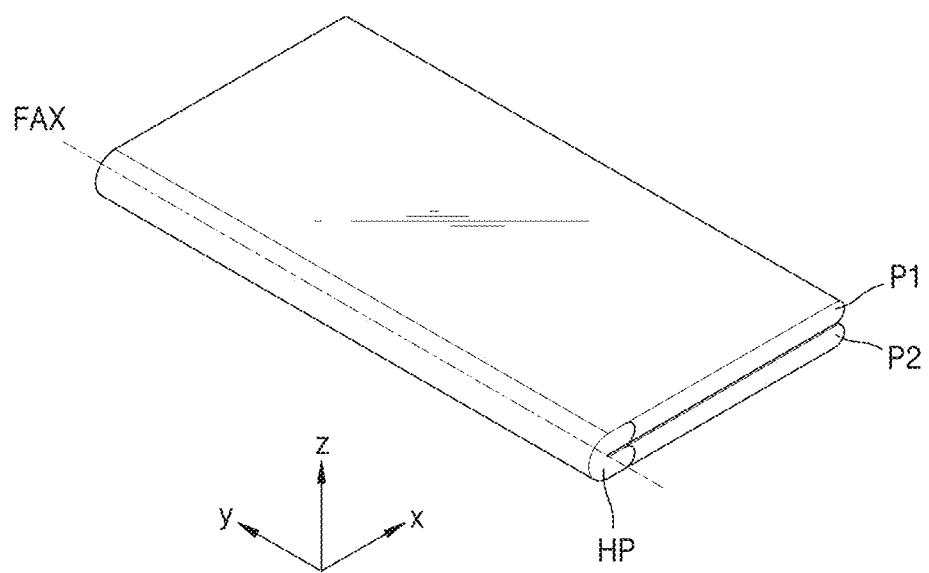

FIGS. 1 and 2 are perspective views illustrating a portion of a display apparatus according to an embodiment. In more detail, FIG. 1 illustrates an embodiment of a display apparatus 1 in an unfolded state, and FIG. 2 an embodiment of the display apparatus 1 in a folded state.

Referring to FIGS. 1 and 2, an embodiment of the display apparatus 1 may include a lower cover LC, a display panel DP, and a cover window CW.

In an embodiment, the lower cover LC may include a first portion P1 and a second portion P2 supporting the display panel DP. The lower cover LC may be folded or foldable around a folding axis FAX defined between the first portion P1 and the second portion P2. In an embodiment, the lower cover LC may further include a hinge portion HP, and the hinge portion HP may be provided between the first portion P1 and the second portion P2.

The display panel DP may include a display area DA. The display panel DP may provide an image through an array of a plurality of pixels PX arranged in the display area DA. Each of the pixels PX may be defined as a light-emitting area in which light is emitted by a light-emitting element electrically connected to a pixel circuit. In an embodiment, each pixel PX may emit red, green, or blue light. Alternatively, each pixel PX may emit red, green, blue, or white light.

A light-emitting element provided in the display panel DP may include an organic light-emitting diode, an inorganic light-emitting diode, a micro light-emitting diode and/or a quantum dot emitting diode. Hereinafter, for convenience of description, embodiments in which the light-emitting element provided in the display panel DP includes an organic light-emitting diode will be mainly described. However, the following description is not limited thereto, and may be equally applied to alternative embodiments in which other types of light-emitting elements are provided.

The display area DA may include a first display area DA1 and a second display area DA2 arranged on opposing sides of the folding axis FAX crossing the display area DA. The first display area DA1 and the second display area DA2 may be located on the first portion P1 and the second portion P2 of the lower cover LC, respectively. The display panel DP may provide a first image and a second image using light emitted from the plurality of pixels PX arranged in the first display area DA1 and the second display area DA2. In an embodiment, the first image and the second image may be portions of any one image provided through the display area DA of the display panel DP. In an alternative embodiment, the display panel DP may provide a first image and a second image independent of each other.

The display panel DP may be folded around the folding axis FAX. In a state where the display panel DP is folded, the first display area DA1 and the second display area DA2 of the display panel DP may face each other.

FIGS. 1 and 2 illustrate an embodiment in which the folding axis FAX extends in a y direction, but the disclosure is not limited thereto. In an embodiment, the folding axis FAX may extend in an x direction intersecting with the y direction. Alternatively, the folding axis FAX on an x-y plane may also extend in a direction crossing the x-direction and the y-direction.

FIGS. 1 and 2 illustrate an embodiment in which only a single folding axis FAX is defined, but the disclosure is not limited thereto. In an embodiment, the display panel DP may be folded a plurality of times around a plurality of folding axes FAX crossing the display area DA.

The cover window CW may be on the display panel DP to cover the display panel DP. The cover window CW may be folded or bent according to an external force without cracks or the like occurring. In an state where the display panel DP is folded around the folding axis FAX, the cover window CW may also be folded.

Figure 3A:
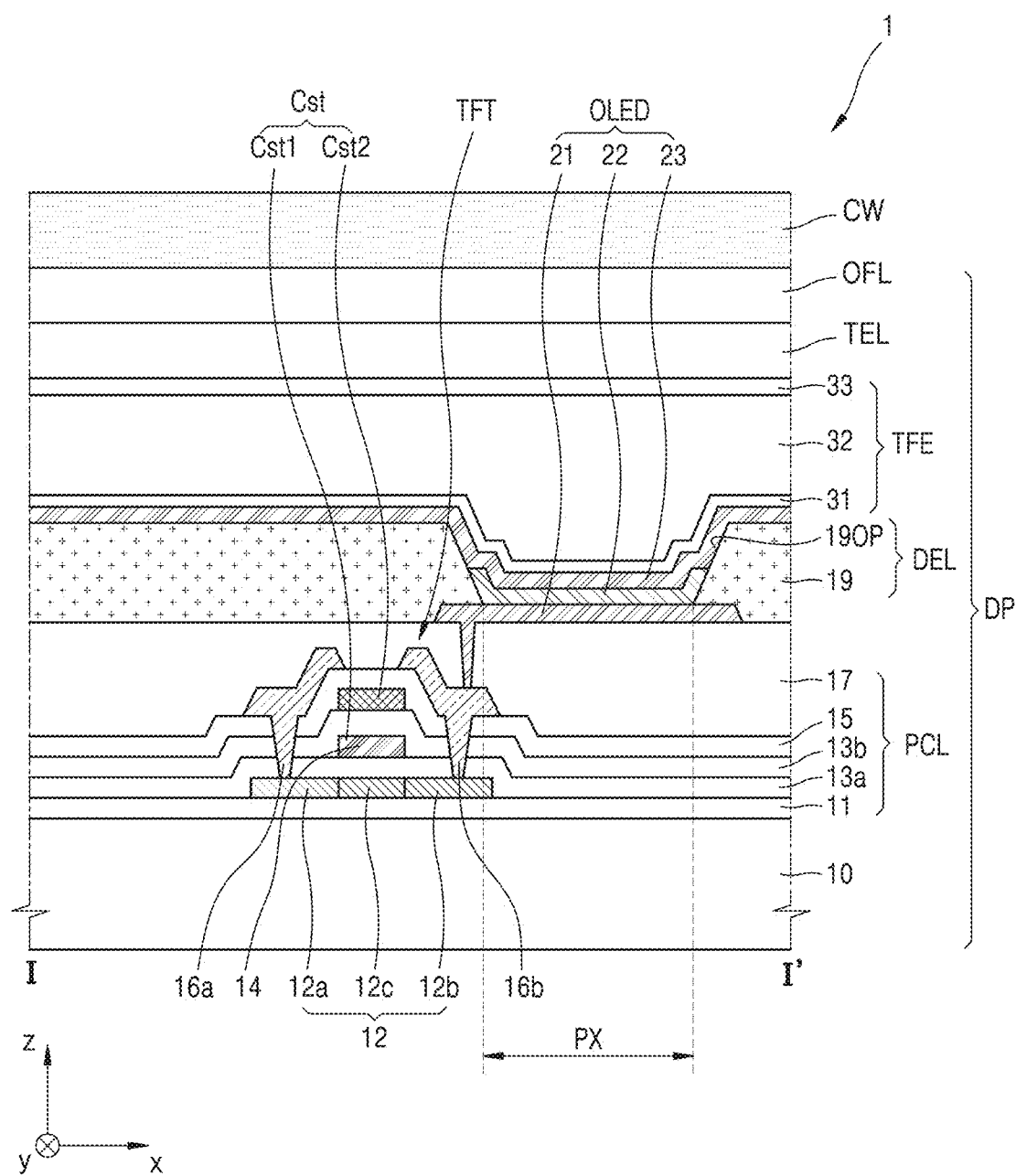
FIG. 3A is a cross-sectional view illustrating a portion of a display apparatus according to an embodiment.
Figure 3B:
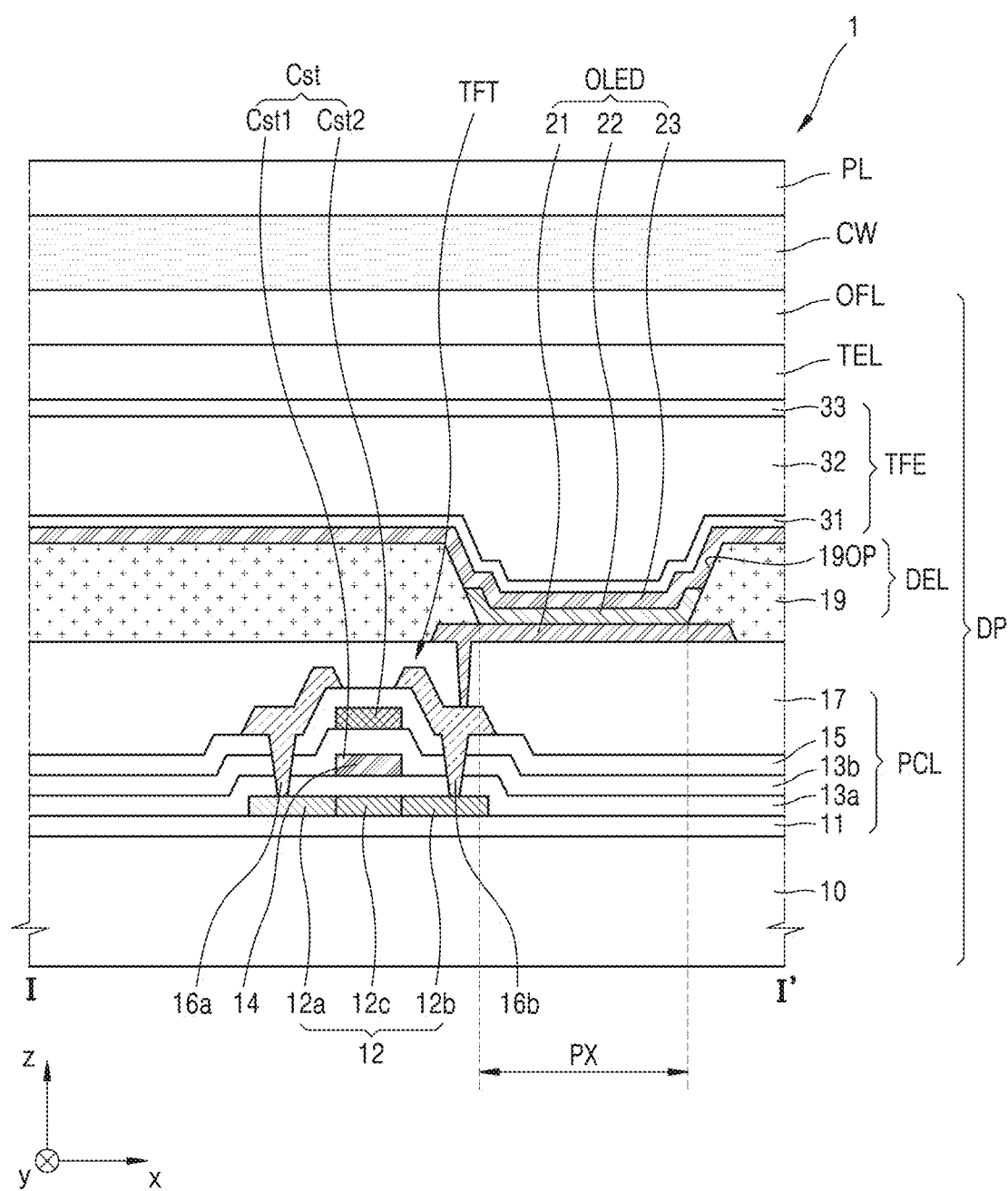
FIG. 3B is a cross-sectional view illustrating a portion of a display apparatus according to an alternative embodiment.

FIG. 3A is a cross-sectional view illustrating a portion of a display apparatus according to an embodiment, and FIG. 3B is a cross-sectional view illustrating a portion of a display apparatus according to an alternative embodiment. FIGS. 3A and 3B may correspond to cross-sectional views of the display apparatus taken along line I-I' of FIG. 1.

Referring to FIGS. 3A and 3B, an embodiment of the display panel DP may include a stacked structure in which a substrate 10, a pixel circuit layer PCL, a display element layer DEL, a thin film encapsulation layer TFE, a touch electrode layer TEL, and an optical functional layer OFL are sequentially stacked one on another.

In an embodiment, the substrate 10 may include or be made of glass or a polymer resin. In such an embodiment, the polymer resin may include at least one selected from polyether sulfone, polyarylate, polyether imide, polyethylene naphthalate, polyethylene terephthalate, polyphenylene sulfide, polyimide, polycarbonate, cellulose triacetate, cellulose acetate propionate, and the like.

The pixel circuit layer PCL may be on the substrate 10. FIGS. 3A and 3B show an embodiment where the pixel circuit layer PCL includes a thin-film transistor TFT, and a buffer layer 11, a first insulating layer 13a, a second insulating layer 13b, a third insulating layer 15, and a planarization layer 17 below or/and above components of the thin-film transistor TFT.

In such an embodiment, the buffer layer 11 may reduce or block the penetration of foreign materials, moisture, or external air from a lower portion of the substrate 10 and may provide a flat surface on the substrate 10. The buffer layer 11 may include an inorganic insulating material such as silicon nitride, silicon oxynitride, and silicon oxide, and may have a single layer structure or a multilayer structure, each layer therein including at least one selected from the aforementioned inorganic insulating materials.

The thin-film transistor TFT on the buffer layer 11 may include a semiconductor layer 12, and the semiconductor layer 12 may include polysilicon. Alternatively, the semiconductor layer 12 may include amorphous silicon, an oxide semiconductor, an organic semiconductor, or the like. The semiconductor layer 12 may include a channel area 12c, and a drain area 12a and a source area 12b arranged at opposing sides of the channel area 12c, respectively. A gate electrode 14 may overlap the channel area 12c.

The gate electrode 14 may include a low resistance metal material. The gate electrode 14 may include a conductive material including molybdenum (Mo), aluminum (Al), copper (Cu), titanium (Ti), or the like, and may have a single layer structure or a multilayer structure, each layer therein including at least one selected from the above-described materials.

The first insulating layer 13a may be between the semiconductor layer 12 and the gate electrode 14. The first insulating layer 13a may include an inorganic insulating material such as silicon oxide ($SiO_x$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO).

The second insulating layer 13b may be disposed to cover the gate electrode 14. The second insulating layer 13b may include an inorganic insulating material such as $SiO_x$, SiNx, SiON, $Al_2O_3$, $TiO_2$, $Ta_2O_5$, $HfO_2$, or ZnO.

An upper electrode Cst2 of a storage capacitor Cst may be on the second insulating layer 13b. The upper electrode Cst2 may at least partially overlap the gate electrode 14 arranged therebelow. The gate electrode 14 and the upper electrode Cst2 overlapping each other with the second insulating layer 13b therebetween may form the storage capacitor Cst. In such an embodiment, the gate electrode 14 may function as a lower electrode Cst1 of the storage capacitor Cst.

In an embodiment, the storage capacitor Cst and the thin-film transistor TFT may overlap each other. In an alternative embodiment, the storage capacitor Cst may not overlap the thin-film transistor TFT. In such an embodiment, the lower electrode Cst1 of the storage capacitor Cst is a separate component from the gate electrode 14 and may be formed to be apart from the gate electrode 14.

The upper electrode Cst2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may have a single layer structure or a multilayer structure, each layer therein including at least one selected from the above-described materials.

The third insulating layer 15 may cover the upper electrode Cst2. The third insulating layer 15 may include $SiO_x$, SiNx, SiON, $Al_2O_3$, $TiO_2$, $Ta_2O_5$, $HfO_2$, or ZnO. The third insulating layer 15 may have a single layer structure or a multilayer structure, each layer therein including at least one selected from the above-described inorganic insulating materials.

A drain electrode 16a and a source electrode 16b may be on the third insulating layer 15, respectively. The drain electrode 16a and the source electrode 16b may be connected to the drain area 12a and the source area 12b through contact holes defined in insulating layers below the drain electrode 16a and the source electrode 16b, respectively. The drain electrode 16a and the source electrode 16b may include a material having good conductivity. The drain electrode 16a and the source electrode 16b may include a conductive material including Mo, Al, Cu, Ti, and the like, and may have a single layer structure or a multilayer structure. In an embodiment, the drain electrode 16a and the source electrode 16b may have a multilayer structure of Ti/Al/Ti.

The planarization layer 17 may include an organic insulating material. The planarization layer 17 may include an organic insulating material such as a general commercial polymer such as polymethyl methacrylate ("PMMA") or polystyrene ("PS"), a polymer derivative including a phenolic group, an acrylic polymer, an imide polymer, an aryl ether polymer, an amide polymer, a fluorine-based polymer, a p-xylene-based polymer, a vinyl alcohol polymer, and a blend thereof.

The display element layer DEL is on the pixel circuit layer PCL having the above-described structure. The display element layer DEL may include an organic light-emitting diode OLED as a light-emitting element, and the organic light-emitting diode OLED may include a stacked structure in which a first electrode 21, a light-emitting layer 22, and a second electrode 23 are sequentially stacked one on another. The first electrode 21 of the organic light-emitting diode OLED may be electrically connected to the thin-film transistor TFT through a contact hole defined in the planarization layer 17.

The first electrode 21 may include a conductive oxide such as indium tin oxide ("ITO"), indium zinc oxide ("IZO"), zinc oxide (ZnO), indium oxide ($In_2O_3$), indium gallium oxide ("IGO"), and aluminum zinc oxide ("AZO"). In an embodiment, the first electrode 21 may include a reflective layer including Ag, Mg, Al, Pt, Pd, Au, Ni, Nd, Ir, Cr, or a compound thereof. Alternatively, in an embodiment, the first electrode 21 may further include a film including or formed of ITO, IZO, ZnO, or $In_2O_3$ above/below the above-described reflective layer.

A pixel-defining layer 19 may be arranged on the first electrode 21, and an opening 19OP may be defined through the pixel-defining layer 19 to expose at least a portion of the first electrode 21. The pixel-defining layer 19 may include an organic insulator and/or an inorganic insulating material. The opening 19OP may define a light-emitting area of light emitted from the organic light-emitting diode OLED. In an embodiment, for example, the size/width of the opening 19OP may correspond to the size/width of the light-emitting area. Accordingly, the size and/or width of the pixel PX may depend on the size and/or width of the opening 19OP of the corresponding pixel-defining layer 19.

The light-emitting layer 22 may be arranged in the opening 19OP of the pixel-defining layer 19. The light-emitting layer 22 may include a high-molecular weight organic material or a low-molecular weight organic material that emits light of a certain color. Alternatively, the light-emitting layer 22 may include an inorganic light-emitting material or quantum dots.

Although not shown in FIGS. 3A and 3B, a first functional layer and a second functional layer may be arranged below and above the light-emitting layer 22, respectively. The first functional layer may include, for example, a hole transport layer ("HTL") or a hole transport layer and a hole injection layer ("HIL"). The second functional layer may include an electron transport layer ("ETL") and/or an electron injection layer ("EIL"). However, the disclosure is not limited thereto. The first functional layer and the second functional layer may be selectively arranged above and below the light-emitting layer 22, respectively.

The first functional layer and/or the second functional layer may be a common layer which entirely covers the substrate 10 as the second electrode 23 to be described later below.

The second electrode 23 may be on the first electrode 21 and may overlap the first electrode 21. The second electrode 23 may include a conductive material having a low work function. In an embodiment, for example, the second electrode 23 may include a (semi) transparent layer including Ag, Mg, Al, Pt, Pd, Au, Ni, Nd, Ir, Cr, lithium (Li), Ca, or an alloy thereof. Alternatively, the second electrode 23 may further include a layer such as ITO, IZO, ZnO, or $In_2O_3$ on the (semi) transparent layer including at least one selected from the above-described materials. The second electrode 23 may be integrally formed as single unitary unit to entirely cover the substrate 10.

An encapsulation member may be arranged (or disposed) on the display element layer DEL. In an embodiment, the encapsulation member may be provided or function as the thin film encapsulation layer TFE. The thin film encapsulation layer TFE may be arranged on the display element layer DEL and cover the display element layer DEL. The thin film encapsulation layer TFE may include at least one inorganic encapsulation layer and at least one organic encapsulation layer. In an embodiment, the thin film encapsulation layer TFE may include a first inorganic encapsulation layer 31, an organic encapsulation layer 32, and a second inorganic encapsulation layer 33, which are sequentially stacked one on another. In an alternative embodiment, the encapsulation member may be provided or function as an encapsulation substrate.

The first inorganic encapsulation layer 31 and the second inorganic encapsulation layer 33 may include one or more inorganic insulating materials such as aluminum oxide, titanium oxide, tantalum oxide, hafnium oxide, zinc oxide, silicon oxide, silicon nitride, and silicon oxynitride. In an embodiment, the organic encapsulation layer 32 may include a polymer-based material. In such an embodiment, the polymer-based material may include an acrylic resin, an epoxy resin, polyimide, and/or polyethylene, for example. In an embodiment, the organic encapsulation layer 32 may include acrylate. The organic encapsulation layer 32 may be formed by curing a monomer or applying a polymer.

The touch electrode layer TEL including touch electrodes may be arranged on the thin film encapsulation layer TFE, and the optical functional layer OFL may be arranged on the touch electrode layer TEL. The touch electrode layer TEL may obtain coordinate information according to an external input, for example, a touch event. The optical functional layer OFL may reduce the reflectance of light (external light) incident from the outside toward the display apparatus 1, and may improve the color purity of light emitted from the display apparatus 1.

In an embodiment, the optical functional layer OFL may include a retarder and/or a polarizer. The retarder may be of a film type or a liquid crystal coating type, and may include a $\lambda/2$ retarder and/or a $\lambda/4$ retarder. The polarizer may also be of a film type or a liquid crystal coating type. The film type may include a stretch-type synthetic resin film, and the liquid crystal coating type may include liquid crystals arranged in a certain arrangement. The retarder and the polarizer may further include a protective film.

In an embodiment, the optical functional layer OFL may include a destructive interference structure. The destructive interference structure may include a first reflective layer and a second reflective layer on respective layers. First reflected light and second reflected light respectively reflected by the first reflective layer and second reflective layer may destructively interfere with each other, and thus external light reflectance may be reduced.

An adhesive member may be between the touch electrode layer TEL and the optical functional layer OFL. In an embodiment, a conventional adhesive known in the art may be employed as the adhesive member without limitation. In an embodiment, for example, the adhesive member may be a pressure-sensitive adhesive.

The cover window CW may be on the display panel DP. The cover window CW may be adhered to the display panel DP by an adhesive member. The adhesive member may be, for example, a pressure-sensitive adhesive.

The cover window CW may have a high transmittance to transmit light emitted from the display panel DP. In an embodiment, the transmittance of the cover window CW may be about 85% or more, and a transmission haze may be about 2% or less, but is not limited thereto.

In an embodiment, the cover window CW may have a thin thickness to minimize the weight of the display apparatus 1, and may have strong strength and hardness to protect the display panel DP from external impact. In an embodiment, the cover window CW may include at least one glass and a glass fiber composite layer 100 (see FIG. 4). The cover window CW will be described below in greater detail with reference to FIGS. 4 to 13.

In an embodiment, as shown in FIG. 3B, a protective layer PL may be on the cover window CW. The protective layer PL may cover the cover window CW and protect the cover window CW. The protective layer PL may include at least one transparent synthetic resin selected from polyethylene terephthalate ("PET)", polypropylene ("PP"), polystyrene ("PS"), polyimide ("PI"), and the like, and may include a hard coating layer. In an embodiment, an adhesive member, for example, a pressure-sensitive adhesive may be between the protective layer PL and the cover window CW. In an alternative embodiment, as shown in FIG. 3A, the protective layer PL may be omitted. In such an embodiment, an outermost surface of the display apparatus 1 may be defined by the cover window CW to improve the glass texture.

Figure 4:
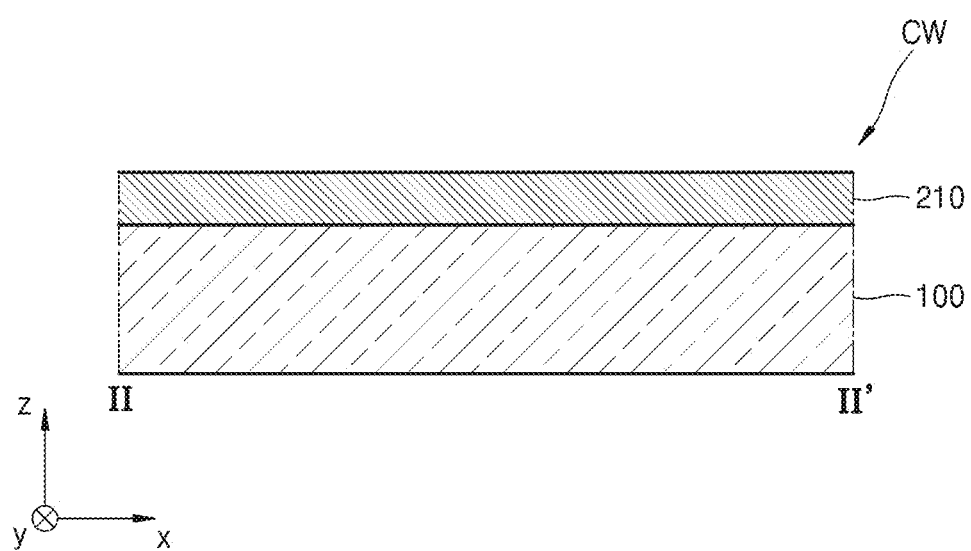
FIG. 4 is a cross-sectional view illustrating a portion of a cover window according to an embodiment.

FIG. 4 is a cross-sectional view illustrating a portion of a cover window according to an embodiment.

An embodiment of the cover window CW may include at least one glass and a glass fiber composite layer 100. In an embodiment, as shown in FIG. 4, the cover window CW may include a glass fiber composite layer 100 and a first glass 210 arranged or disposed on a first surface of the glass fiber composite layer 100. Herein, the first surface of the glass fiber composite layer 100 may be any surface of the glass fiber composite layer 100. In an embodiment, For example, the first surface of the glass fiber composite layer 100 may be an upper surface of the glass fiber composite layer 100 in a +z-axis direction or a thickness direction of the cover window CW.

The glass fiber composite layer 100 is a layer including glass fibers and may have a certain thickness. In an embodiment, the thickness of the glass fiber composite layer 100 may be greater than the first glass 210, but is not limited thereto. In such an embodiment, because the cover window CW includes the glass fiber composite layer 100, the cover window CW has a relatively greater thickness than a case where only the first glass 210 is provided, and accordingly, the impact resistance may be improved. However, as the thickness thereof increases, flexibility such as folding characteristics may be undesirably reduced. According to embodiments of the invention, the glass fiber composite layer 100 includes unidirectional glass fibers, such that flexibility in at least one direction may be improved.

The first glass 210 may include glass or plastic. In an embodiment, the first glass 210 may be ultra-thin tempered glass of which strength is increased by a method such as chemical strengthening or thermal strengthening, but is not limited thereto. In an embodiment, where the cover window CW defines the outermost portion of the display apparatus, the first glass 210 may be the outermost surface of the display apparatus 1 (see FIG. 3A), and accordingly, the glass texture of the surface of the display apparatus 1 may be improved.

Hereinafter, various embodiments of the cover window CW will be described with reference to FIGS. 5A to 13. In addition, in the drawings, the same reference numerals denote the same components, and thus, any repetitive detailed description thereof will be omitted or simplified, and differences will be mainly described for each embodiment.

Figure 5A:
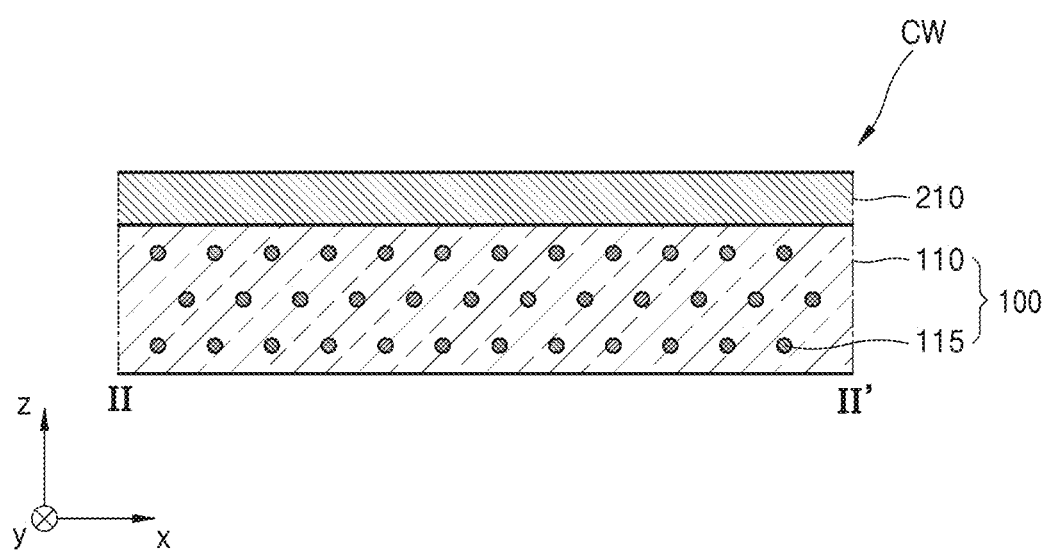
FIG. 5A is a cross-sectional view illustrating a portion of a cover window according to an embodiment.
Figure 5B:
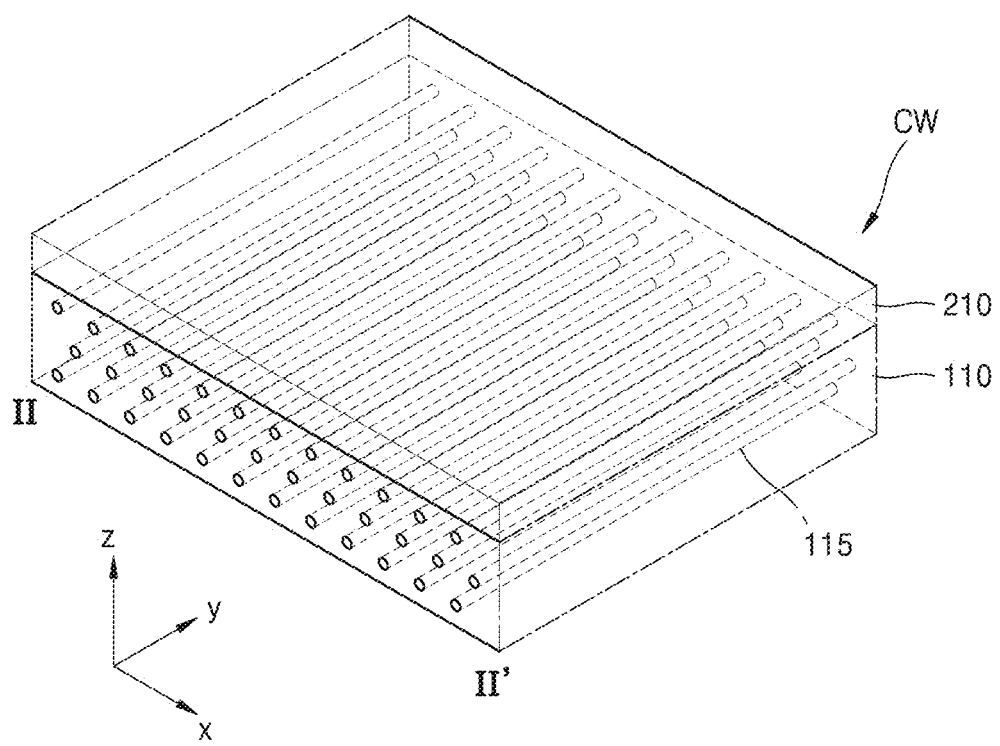
FIG. 5B is a perspective view illustrating a portion of the cover window of FIG. 5A.

FIG. 5A is a cross-sectional view illustrating a portion of a cover window according to an embodiment, and FIG. 5B is a perspective view illustrating a portion of the cover window of FIG. 5A.

In an embodiment, as shown in FIGS. 5A and 5B, the cover window CW may include the glass fiber composite layer 100 having a single layer structure and the first glass 210 arranged or disposed on a first surface of the glass fiber composite layer 100. The glass fiber composite layer 100 may include a first glass fiber layer 110.

In an embodiment, the first glass fiber layer 110 is a glass fiber layer including unidirectional glass fibers 115 apart from each other. In such an embodiment, the first glass fiber layer 110 may include a resin and unidirectional glass fibers 115 apart from each other inside the resin. The unidirectional glass fibers 115 are glass fibers extending in the first direction, respectively. In such an embodiment, each of the unidirectional glass fibers 115 may have a shape extending in the first direction. As the first glass fiber layer 110 includes the unidirectional glass fibers 115, the modulus of the first glass fiber layer 110 may exhibit anisotropy. Herein, the term "modulus" may be an elastic modulus representing a ratio of stress and strain.

In such an embodiment, the first glass fiber layer 110 may have a different modulus depending on the direction, and accordingly, the glass fiber composite layer 100 including the first glass fiber layer 110 may have a different modulus depending on the direction. In an embodiment, in the first glass fiber layer 110, the modulus in the first direction (e.g., the y-axis direction), which is a direction in which each of the unidirectional glass fibers 115 extends, may be relatively greater than the modulus in a second direction (e.g., the x-axis direction) perpendicular to the first direction. The relatively great modulus in the first direction means that the stress required to deform the first glass fiber layer 110 in the first direction is large, and thus it can be understood that the flexibility in the first direction is poor. Similarly, the relatively less modulus in the second direction means that the stress required to deform the first glass fiber layer 110 in the second direction is small, and thus it can be understood that the flexibility in the second direction is excellent.

In an embodiment, a direction in which the unidirectional glass fibers 115 included in the first glass fiber layer 110 extend may be parallel to the folding axis FAX (see FIG. 1). In such an embodiment, the modulus of the first glass fiber layer 110 in the direction of the folding axis FAX may be greater than the modulus of the direction perpendicular to the direction of the folding axis FAX. In such an embodiment, the first glass fiber layer 110 may have poor flexibility in the direction of the folding axis FAX, but may have high flexibility in the direction perpendicular to the folding axis FAX. Accordingly, the display apparatus 1 (see FIG. 1) may be easily folded with respect to the folding axis FAX in the direction perpendicular to the folding axis FAX.

In an embodiment, a difference between a refractive index of a resin included in the first glass fiber layer 110 and a refractive index of the unidirectional glass fibers 115 may be controlled to be in a predetermined range. In an embodiment, the refractive index of the resin included in the first glass fiber layer 110 and the refractive index of the unidirectional glass fibers 115 may be controlled to be equal to or similar to each other. In such an embodiment, visual recognition of the unidirectional glass fibers 115 may be prevented or minimized.

In an embodiment, for example, the difference between the refractive index of the resin included in the first glass fiber layer 110 and the refractive index of the unidirectional glass fibers 115 may be about 0.02 or less. In an embodiment, for example, when the refractive index of the unidirectional glass fibers 115 is about 1.512, the refractive index of the resin included in the first glass fiber layer 110 may satisfy about 1.492 or more and about 1.532 or less. In such an embodiment, the refractive index of the resin included in the first glass fiber layer 110 and the refractive index of the unidirectional glass fibers 115 are not limited to those described above and may be variously modified.

In an embodiment, a volume ratio of the resin included in the first glass fiber layer 110 and the unidirectional glass fibers 115 may be controlled to be in a predetermined range.

In such an embodiment, the first glass fiber layer 110 may have optimum impact resistance and flexibility.

In an embodiment, for example, the first glass fiber layer 110 may include a resin of about 10% or more and about 30% or less by volume and the unidirectional glass fibers 115 of about 70% or more and about 90% or less by volume. In such an embodiment, the volume ratio of the resin included in the first glass fiber layer 110 and the unidirectional glass fibers 115 is not limited to those described above and may be variously modified.

Figure 6:
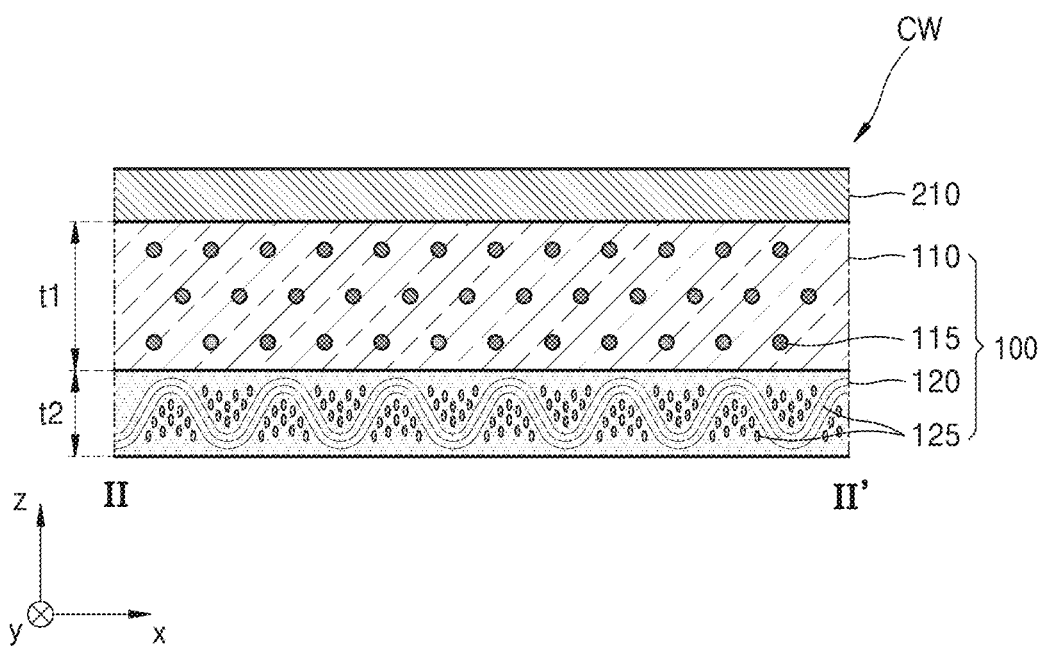
FIG. 6 is a cross-sectional view illustrating a portion of a cover window according to an alternative embodiment.
Figure 7:
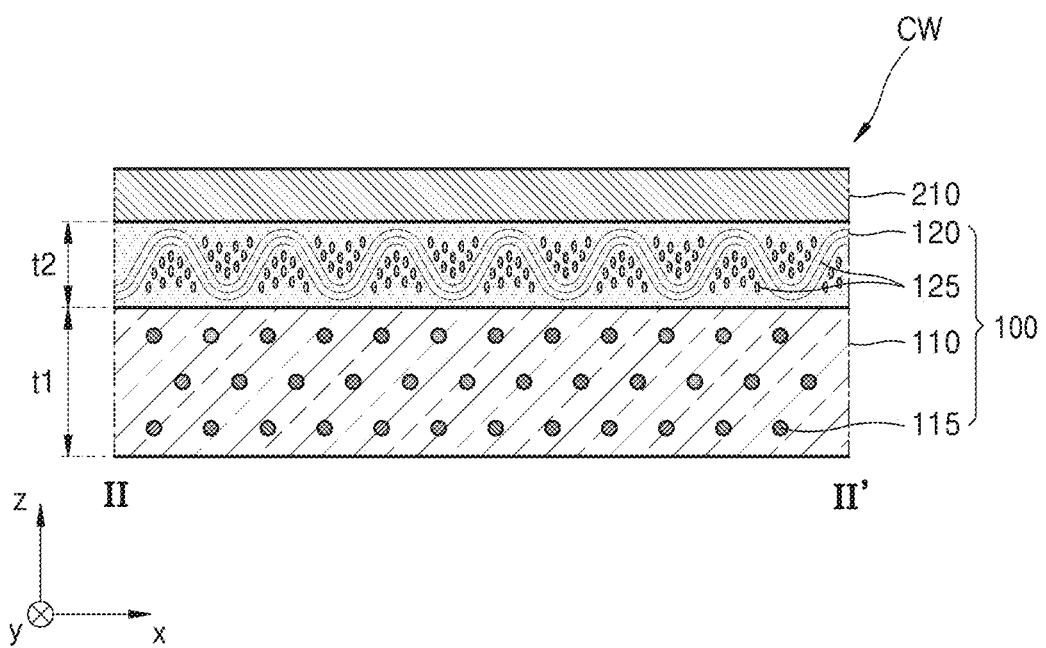
FIG. 7 is a cross-sectional view illustrating a portion of a cover window according to another alternative embodiment.

FIG. 6 is a cross-sectional view illustrating a portion of a cover window according to an alternative embodiment, and FIG. 7 is a cross-sectional view illustrating a portion of a cover window according to another alternative embodiment.

In an embodiment, as shown in FIGS. 6 and 7, the cover window CW may include the glass fiber composite layer 100 having a two-layer structure and the first glass 210 arranged or disposed on a first surface of the glass fiber composite layer 100. The glass fiber composite layer 100 may include the first glass fiber layer 110 including the unidirectional glass fibers 115 and a second glass fiber layer 120 including woven glass fibers 125. In such an embodiment, the first glass fiber layer 110 is substantially the same as that described above with reference to FIGS. 5A and 5B, and any repetitive detailed description thereof will be omitted.

The second glass fiber layer 120 is a glass fiber layer including the woven glass fibers 125. In an embodiment, the second glass fiber layer 120 may include a resin and the woven glass fibers 125 arranged in a way such that the woven glass fibers 125 define warps and wefts perpendicular to each other inside the resin. The woven glass fibers 125 may include wefts extending in the first direction (e.g., the y-direction) and warps extending in the second direction (e.g., the x-direction) perpendicular to the first direction, where the wefts and the warps may be arranged to be orthogonal to each other.

The second glass fiber layer 120 may improve the impact resistance of the cover window CW. While the second glass fiber layer 120 has high impact resistance than the first glass fiber layer 110, as the thickness of the second glass fiber layer 120 included in the glass fiber composite layer 100 increases, the flexibility of the glass fiber composite layer 100 decreases, and accordingly, the flexibility of the cover window CW decreases. Accordingly, each of a thickness t1 of the first glass fiber layer 110 and a thickness t2 of the second glass fiber layer 120 may be variously modified considering desired impact resistance and flexibility.

In an embodiment, the thickness t1 of the first glass fiber layer 110 may be greater than the thickness t2 of the second glass fiber layer 120. In such an embodiment, the second glass fiber layer 120 including the woven glass fibers 125 may be minimally included within a range that supplements the impact resistance of the cover window CW, and the flexibility may be secured through the first glass fiber layer 110 including the unidirectional glass fibers 115.

However, a positional relationship between the first glass fiber layer 110 and the second glass fiber layer 120 included in the glass fiber composite layer 100 is not limited. In an embodiment, as shown in FIG. 6, the first glass fiber layer 110 may be between the first glass 210 and the second glass fiber layer 120. In such an embodiment, the first glass fiber layer 110 may be on the second glass fiber layer 120, and the first glass 210 may be on the first glass fiber layer 110. In an alternative embodiment, as shown in FIG. 7, the second glass fiber layer 120 may be between the first glass 210 and the first glass fiber layer 110. In such an embodiment, the second glass fiber layer 120 may be on the first glass fiber layer 110, and the first glass 210 may be on the second glass fiber layer 120.

Figure 8:
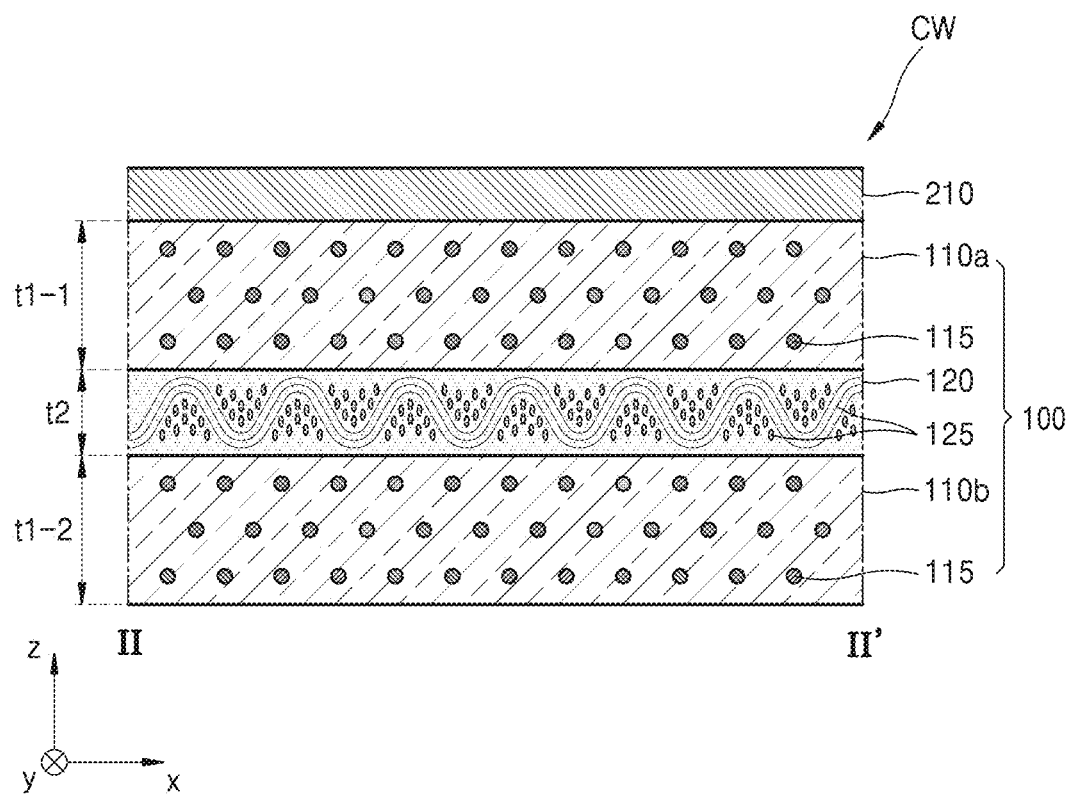
FIG. 8 is a cross-sectional view illustrating a portion of a cover window according to another alternative embodiment.
Figure 9:
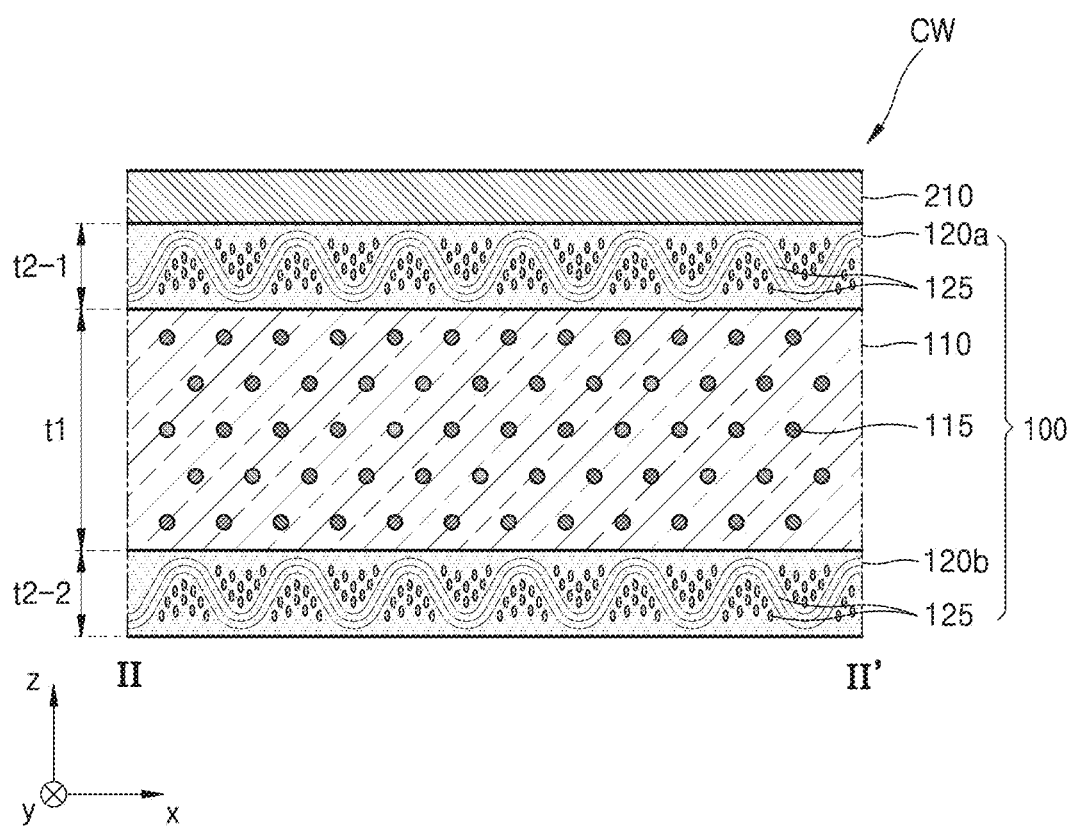
FIG. 9 is a cross-sectional view illustrating a portion of a cover window according to another alternative embodiment.

FIG. 8 is a cross-sectional view illustrating a portion of a cover window according to another alternative embodiment, and FIG. 9 is a cross-sectional view illustrating a portion of a cover window according to another alternative embodiment.

In an embodiment, as shown in FIGS. 8 and 9, the cover window CW may include the glass fiber composite layer 100 having a three-layer structure and the first glass 210 arranged or disposed on a first surface of the glass fiber composite layer 100. The glass fiber composite layer 100 may include the first glass fiber layer 110 including the unidirectional glass fibers 115 and the second glass fiber layer 120 including the woven glass fibers 125.

In an embodiment, the first glass fiber layer 110 may include a first-first glass fiber layer 110a and a second-first glass fiber layer 110b. In such an embodiment, the glass fiber composite layer 100 may include the first-first glass fiber layer 110a, the second-first glass fiber layer 110b, and the second glass fiber layer 120. In such an embodiment, a thickness of the first glass fiber layer 110 may be a sum of a thickness t1-1 of the first-first glass fiber layer 110a and a thickness t1-2 of the second-first glass fiber layer 110b. The sum of the thickness t1-1 of the first-first glass fiber layer 110a and the thickness t1-2 of the second-first glass fiber layer 110b may be greater than the thickness t2 of the second glass fiber layer 120.

In an alternative embodiment, the second glass fiber layer 120 may include a first-second glass fiber layer 120a and a second-second glass fiber layer 120b. In such an embodiment, the glass fiber composite layer 100 may include the first glass fiber layer 110, the first-second glass fiber layer 120a, and the second-second glass fiber layer 120b. In such an embodiment, a thickness of the second glass fiber layer 120 may be a sum of a thickness t2-1 of the first-second glass fiber layer 120a and a thickness t2-2 of the second-second glass fiber layer 120b. A thickness of the first glass fiber layer 110 may be greater than the sum of the thickness t2-1 of the first-second glass fiber layer 120a and the thickness t2-2 of the second-second glass fiber layer 120b.

In an alternative embodiment, although not shown for convenience, the glass fiber composite layer 100 may have a multilayer structure of four or more layers. In such an embodiment, there is no limitation on the type and arrangement of glass fiber layers included in the multilayer structure of the glass fiber composite layer 100. However, in such an embodiment, the total thickness of the first glass fiber layer 110 including the unidirectional glass fibers 115 may be greater than the total thickness of the second glass fiber layer 120 including the woven glass fibers 125. In such an embodiment, the second glass fiber layer 120 including the woven glass fibers 125 may be minimally included within a range that supplements the impact resistance of the cover window CW, and the flexibility may be secured through the first glass fiber layer 110 including the unidirectional glass fibers 115.

Figure 10:
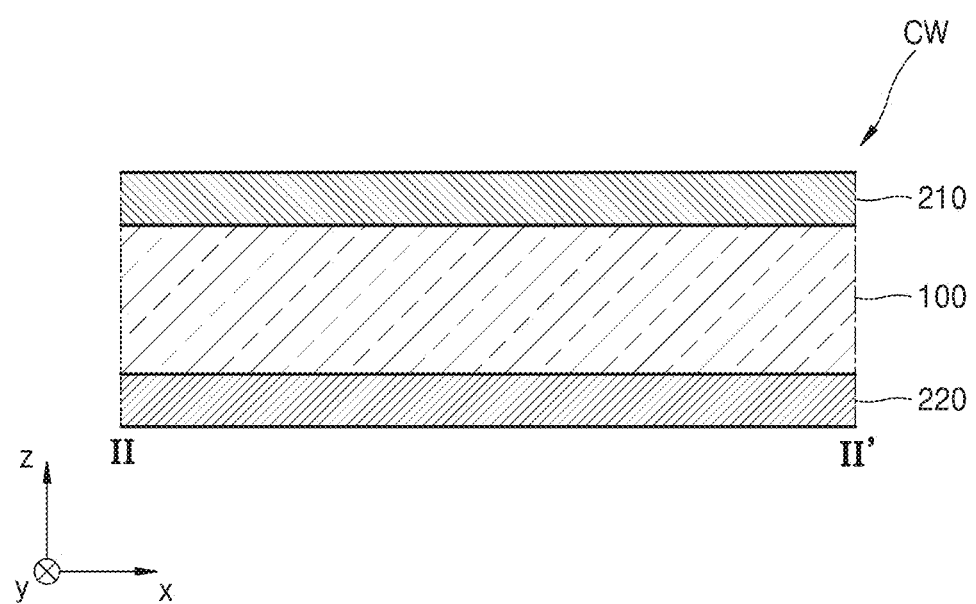
FIG. 10 is a cross-sectional view illustrating a portion of a cover window according to another alternative embodiment.

FIG. 10 is a cross-sectional view illustrating a portion of the cover window CW according to another alternative embodiment.

In an embodiment, as shown in FIG. 10, the cover window CW may include the glass fiber composite layer 100, the first glass 210 on a first surface of the glass fiber composite layer 100, and a second glass 220 on a second surface of the glass fiber composite layer 100. In such an embodiment, the glass fiber composite layer 100 may be between the first glass 210 and the second glass 220.

Herein, the first surface and the second surface of the glass fiber composite layer 100 may refer to any opposing surfaces of the glass fiber composite layer 100, respectively. In an embodiment, for example, the first surface of the glass fiber composite layer 100 may refer to an upper surface of the glass fiber composite layer 100 in the +z-axis direction, and the second surface may refer to a lower surface of the glass fiber composite layer 100 in a −z-axis direction.

The first glass 210 and the second glass 220 may include glass or plastic. In an embodiment, the second glass 220 may be ultra-thin tempered glass of which strength is increased by a method such as chemical strengthening or thermal strengthening, but is not limited thereto. In an embodiment, the first glass 210 and the second glass 220 may include the same material, but are not limited thereto. In an embodiment, for example, the first glass 210 and the second glass 220 may include different materials from each other.

In such an embodiment, the glass fiber composite layer 100 between the first glass 210 and the second glass 220 is substantially the same as that described above with reference to FIGS. 4 to 9, and any repetitive detailed description thereof will be omitted.

Figure 11:
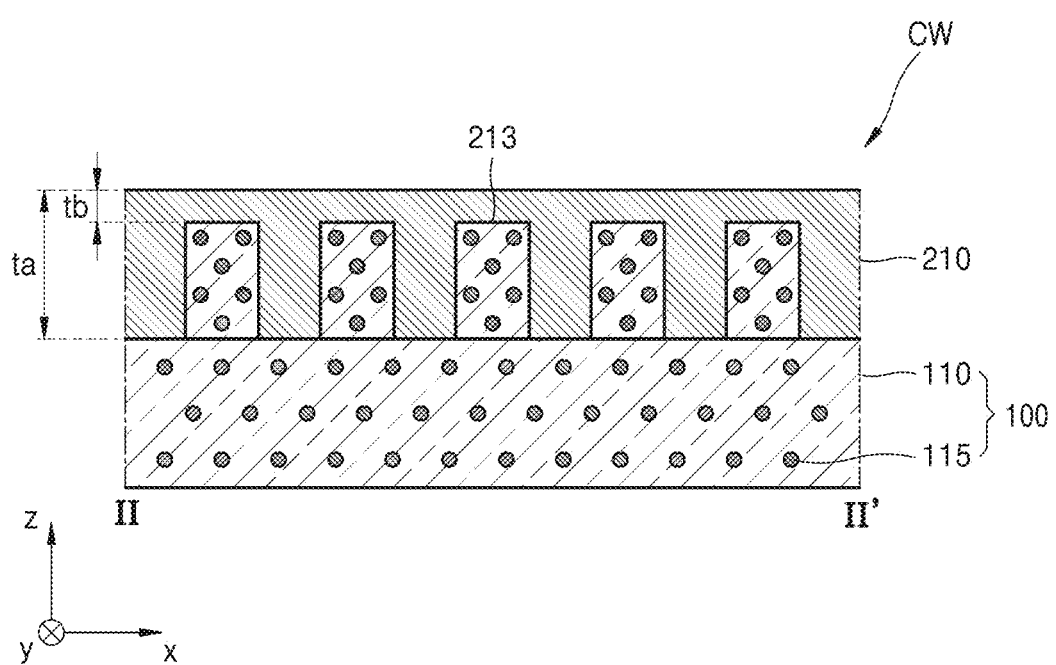
FIG. 11 is a cross-sectional view illustrating a portion of a cover window according to another alternative embodiment.

FIG. 11 is a cross-sectional view illustrating a portion of the cover window CW according to another alternative embodiment.

In an embodiment, as shown in FIG. 11, the cover window CW may include the glass fiber composite layer 100 and the first glass 210 arranged on a first surface of the glass fiber composite layer 100.

The first glass 210 may include a plurality of trenches 213 apart from each other. The plurality of trenches 213 may be patterned to be apart from each other in the x-direction in the cross-sectional view.

In an embodiment, a configuration of each of the trenches 213 may be the same as that of the first glass fiber layer 110. Each of the plurality of trenches 213 may include resin and the unidirectional glass fibers 115 apart from each other in the resin. In such an embodiment, the unidirectional glass fibers 115 included in the trenches 213 may be apart from each other in a trench 213 and may have a shape extending in a first direction. In such an embodiment, the first glass 210 includes a portion in which the trenches 213 including the unidirectional glass fibers 115 are patterned, such that the flexibility may be improved than a case in which the trenches 213 are not patterned.

In an embodiment, a thickness of the first glass 210 may be different for each area. In such an embodiment, a thickness to of a portion in the first glass 210 where the trench 213 is not arranged may be greater than a thickness tb of a portion in the first glass 210 in which the trench 213 is arranged. In such an embodiment, the first glass 210 is located to cover the patterned trenches 213 and may approximately have a flat top surface.

However, the shape of the trenches 213 is not limited thereto. In an embodiment, for example, as shown in FIG. 11, in the cross-sectional view, the trenches 213 may be provided in a rectangular shape. In an alternative embodiment, unlike shown in FIG. 11, in the cross-sectional view, the trenches 213 may be provided in an arbitrary polygonal shape such as a triangle, a semicircle shape, or a shape in which the letter U is inverted.

Figure 12:
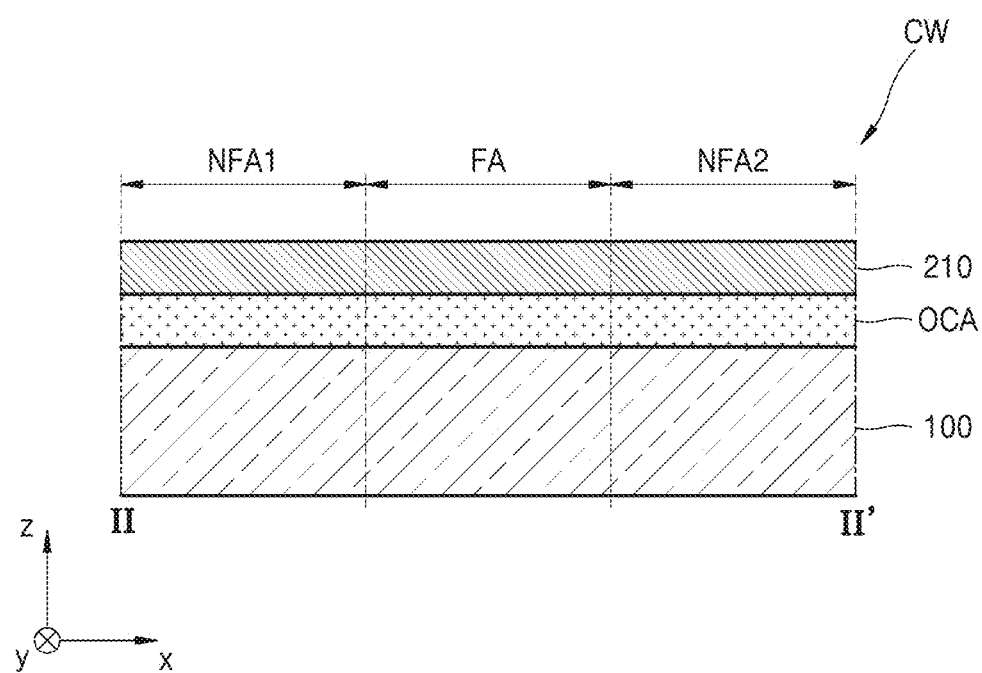
FIG. 12 is a cross-sectional view illustrating a portion of a structure for each area of a cover window according to an embodiment.
Figure 13:
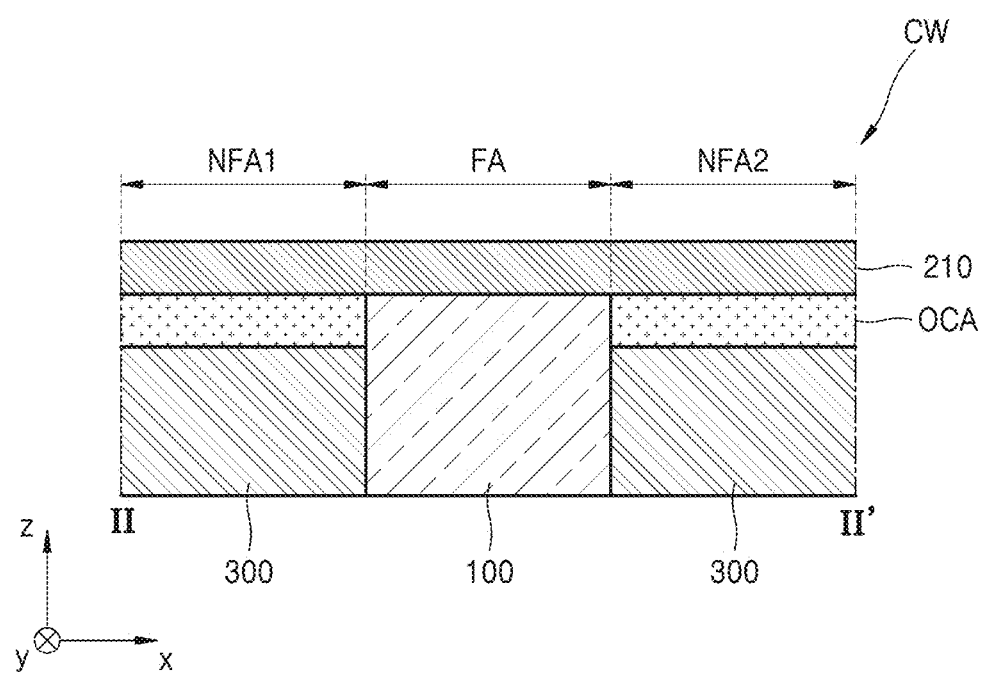
FIG. 13 is a cross-sectional view illustrating a portion of a structure for each area of a cover window according to an alternative embodiment.

FIG. 12 is a cross-sectional view illustrating a portion of a structure for each area of the cover window CW according to an embodiment, and FIG. 13 is a cross-sectional view illustrating a portion of a structure for each area of the cover window CW according to an alternative embodiment.

In an embodiment, as shown in FIGS. 12 and 13, the cover window CW may include a first unfolding area NFA1, a second unfolding area NFA2, and a folding area FA therebetween. The folding area FA may include an area overlapping the folding axis FAX (see FIG. 1) of the display apparatus 1 (see FIG. 1) and an area adjacent thereto. The first unfolding area NFA1 may include an area overlapping the first display area DA1 (see FIG. 1) of the display panel DP (see FIG. 1). The second unfolding area NFA2 may include an area overlapping the second display area DA2 (see FIG. 1) of the display panel DP.

FIGS. 12 and 13 show embodiments in which the cover window CW includes the glass fiber composite layer 100 and the first glass 210 arranged on a first surface of the glass fiber composite layer 100, but the disclosure is not limited thereto. In an alternative embodiment, for example, the cover window CW may further include the second glass 220 (see FIG. 10) arranged on the second surface of the glass fiber composite layer 100 described above with reference to FIG. 10. The first glass 210 and/or the second glass 220 included in the cover window CW may be arranged with respect to a front surface of the cover window CW. In an embodiment, the first glass 210 and/or the second glass 220 included by the cover window CW may have areas corresponding to the folding area FA, the first unfolding area NFA1, and the second unfolding area NFA2.

The glass fiber composite layer 100 may be arranged on the front surface of the cover window CW or may be arranged only in a selected area from among areas included in the cover window CW. In such an embodiment, the glass fiber composite layer 100 may be substantially the same as that described above with reference to FIGS. 4 to 11, and any repetitive detailed description thereof will be omitted.

In an embodiment, as shown in FIG. 12, the glass fiber composite layer 100 may be on the front surface of the cover window CW. In an embodiment, an adhesive (optically clear adhesive; OCA) may be arranged between the glass fiber composite layer 100 and the first glass 210, but in an alternative embodiment, the adhesive OCA may be omitted. In such an embodiment, the cover window CW may have full flexibility without division of areas.

In an alternative embodiment, as shown in FIG. 13, the glass fiber composite layer 100 may be selectively arranged only in the folding area FA of the cover window CW. In such an embodiment, the glass fiber composite layer 100 may be arranged under the first glass 210 in the folding area FA of the cover window CW, and the glass fiber composite layer 100 may not be arranged under the first glass 210 in the first unfolding area NFA1 and the second unfolding area NFA2. In an embodiment, for example, a glass layer 300 may be arranged under the first glass 210 in the first unfolding area NFA1 and the second unfolding area NFA2. The glass layer 300 may be a general glass material that does not include a glass fiber layer or a layer including a plastic material. In an embodiment, for example, the glass layer 300 may not have flexibility or may have significantly lower flexibility than the glass fiber composite layer 100. In an embodiment, the adhesive OCA may be arranged between the glass fiber composite layer 100 and the first glass 210 and/or between the glass layer 300 and the first glass 210, but the adhesive OCA may be omitted in the folding area FA. In such an embodiment, the cover window CW may have different flexibility for each area. The cover window CW may have high flexibility in the folding area FA, may have no flexibility in the first unfolding area NFA1 and the second unfolding area NFA2, or may have significantly lower flexibility than the folding area FA.

The invention should not be construed as being limited to the embodiments set forth herein. Rather, these embodiments are provided so that this disclosure will be thorough and complete and will fully convey the concept of the invention to those skilled in the art.

So far, only a cover window and a display apparatus having the same have been mainly described, but the disclosure is not limited thereto.

For example, it may be understood that a manufacturing method of a cover window for manufacturing such a cover window and a manufacturing method of a display apparatus for manufacturing a display apparatus are also within the scope of the disclosure.

In embodiments of the invention, as described above, a cover window with improved impact resistance and flexibility and a display apparatus including the cover window may be implemented.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A cover window comprising:
    a glass fiber composite layer including a first glass fiber layer; and
    a first glass disposed on a first surface of the glass fiber composite layer,
    wherein the first glass fiber layer comprises a resin and unidirectional glass fibers apart from each other,
    wherein each of the unidirectional glass fibers extends in a first direction,
    wherein a volume ratio of the resin included in the first glass fiber layer is about 10% or greater and about 30% or less,
    wherein a volume ratio of the unidirectional glass fibers included in the first glass fiber layer is about 70% or more and about 90% or less,
    wherein an elastic modulus of the first glass fiber layer in the first direction is greater than an elastic modulus of the first glass fiber layer in a second direction perpendicular to the first direction.

2. The cover window of claim 1, wherein the glass fiber composite layer further comprises a second glass fiber layer including woven glass fibers.

3. The cover window of claim 2, wherein the first glass fiber layer is between the first glass and the second glass fiber layer.

4. The cover window of claim 2, wherein the second glass fiber layer is between the first glass and the first glass fiber layer.

5. The cover window of claim 2, wherein
    the first glass fiber layer comprises a first-first glass fiber layer and a second-first glass fiber layer, and
    the second glass fiber layer is between the first-first glass fiber layer and the second-first glass fiber layer.

6. The cover window of claim 2, wherein
    the second glass fiber layer comprises a first-second glass fiber layer and a second-second glass fiber layer, and
    the first glass fiber layer is between the first-second glass fiber layer and the second-second glass fiber layer.

7. The cover window of claim 2, wherein a thickness of the first glass fiber layer is greater than a thickness of the second glass fiber layer.

8. The cover window of claim 1, wherein
    the first glass includes a plurality of trenches apart from each other, and
    each of the plurality of trenches includes unidirectional glass fibers extending in the first direction.

9. The cover window of claim 1, further comprising:
    a second glass disposed on a second surface of the glass fiber composite layer.

10. The cover window of claim 1, wherein
    the cover window comprises a first unfolding area, a second unfolding area, and a folding area therebetween, and
    the glass fiber composite layer is disposed in at least the folding area.

* * * * *